United States Patent Office 2,792,376
Patented May 14, 1957

2,792,376

PROTECTIVE COATING COMPOSITION CONTAINING VINYL RESIN AND METAL AND METHOD OF MAKING THE COMPOSITION

Raymond G. Binkley, Van Nuys, Calif., assignor to Permaplate Corporation, Los Angeles, Calif., a corporation of California No Drawing. Application November 15, 1952,
Serial No. 320,839

21 Claims. (Cl. 260—32.8)

The present invention has to do with compositions for producing protective coatings on surfaces, and with methods of making such compositions. More particularly, the invention is concerned with compositions that include a liquid vehicle containing a major proportion of a finely divided metal, such as aluminum, magnesium or stainless steel, and a much smaller proportion of a polymerized vinyl resin. A primary object of the invention is the production of protective surface coverings having superior physical qualities such as durability, malleability, firm adhesion to the treated surface, water impermeability and resistance to abrasion.

An important object of the invention is to provide a composition capable of producing such a protective coating without specialized equipment and without requiring special preparation of the surface to be treated. Moreover, the preferred compositions of the invention are economical to produce, are well suited for ordinary handling, storage and preparation and present no special hazards either in preparation or in use.

A further important accomplishment of the invention is to provide compositions of the type described that are fully effective under a wide range of conditions of use. It is particularly important for commercial utility of a protective coating composition that it be successfully applicable throughout a wide temperature range and regardless of the relative humidity of the air. The practical utility of one aspect of the present invention is greatly increased by the fact that a single composition can be used with substantially uniform effectiveness at air temperatures from as low as 10° to over 100° F., and on surfaces at any temperature from about 10° to as much as 180° F.

Coatings produced in accordance with the invention have been found by extended tests to provide remarkable durability under extremely adverse conditions. For example, such coatings applied to steel machinery partially submerged in water adjacent other exposed metals have prevented galvanic action and rust. Coated pieces of wood have been buried in moist ground and yet showed no signs of deterioration after many months. The compositions to be described have been found to produce on concrete surfaces a coating that is remarkably resistant to heavy wear. Moreover, particularly when applied to metals, the coatings of the invention have been found to adhere with remarkable tenacity and to be resistant to the severe abrading effects of very rapid streams of liquid or gas. Such coatings have been found to resist many organic and inorganic acids, and are resistant to heat up to about 450° F. In spite of their remarkably high metal content, the coatings are typically electrically non-conductive, and provide an effective protection against electrolyte corrosion.

An important feature of the invention is the discovery that a superior metal-resin coating can be formed if the metal component of the composition is divided extremely finely, the individual metal particles being of block-like form. The latter term is employed throughout the present specification and claims to designate particles of compact shape, typified in extreme form by spheres and cubes, and including irregular shapes that do not have one dimension very much smaller than the others. Such forms are distinctively different from the flat metal particles, ordinarily referred to as flakes, and commonly employed in coating materials intended primarily for decorative purposes. It has been discovered that greatly improved protective characteristics are obtained when the metal particles, or at least a predominant proportion of them, are of block-like form, rather than flakes. And extremely fine particles of block-like form have been found to give superior results. In particular, very small metal particles tend to prevent the formation of pores in the coating, which may otherwise occur, probably because of too rapid local evaporation of the solvent vehicle. That difficulty is largely avoided by the use of block-like metal particles of about 325 mesh or finer. The finer particle sizes are found to permit use of a more volatile solvent mixture without production of blistering or pinholes. In preferred form of the invention, particles having a mean diameter of about 30 microns, or 0.0012 inch, are employed. No lower limit to the usable particle size has been found, and it is believed that block-like particles even less than 30 microns in diameter may well give satisfactory results.

In general, the non-ferrous metals are preferred for the present purpose, at least as primary metal component. It is desirable that the metal be of a type that is relatively light, to facilitate its stable suspension in the liquid medium, and it should be soft enough to contribute some pliability to the completed coating. Both magnesium and aluminum are highly satisfactory in that respect, and are found to form a strong bond with the surrounding resin. Stainless steel provides more strength than most non-ferrous metals, and may be used alternatively. It is preferred, however, to employ stainless steel only to supplement one of the non-ferrous metals, the latter being provided in major proportion and in the form of fine particles of block-like form, as already described. A relatively small proportion of stainless steel, such as 5 to 25% by volume, tends to reinforce the coating and to enhance its resistance to abrasion. It is particularly advantageous to compensate the higher density of the stainless steel, as compared to such metals as magnesium or aluminum, by providing the heavier metal in a more readily suspendable form. That can be accomplished, for example, by providing stainless steel in the form of flakes and magnesium or aluminum in the generally preferred form of block-like particles. In that way the effective homogeneity of the entire composition is enhanced. And by providing the bulk of the metal not in flaked form, but in the more sturdy block-like particles, the invention is able to retain the important feature of increased strength and durability of the finished coatings.

The metal particles are bound together to form the protective coating of the invention by a binder that comprises typically a polymerized vinyl resin. Such resins include those consisting essentially of polymerized vinyl chloride and typified by the polymerized vinyl chloride composition sold under the trade name Vinylite grade QYNA. However, the type of resin that is formed primarily by the co-polymerization of vinyl chloride and vinyl acetate has been found to be particularly satisfactory for the purpose. A small proportion of maleic acid in the copolymer is sometimes, at least, helpful. A specific example that has been found particularly effective is the copolymer comprising about 86 percent vinyl chloride, about 13 percent vinyl acetate and about 1 percent maleic acid, and sold under the trade name Vinylite type VMCH.

Such resins are soluble in many organic solvents and may be deposited by evaporation of the solvent to form a film that conforms to the shape of any solid objects with which it is in contact. In the present instance, and as will appear, that resin film forms a firm bond with the surface being coated and also with each particle of the finely divided metal of the composition. The metal particles, in spite of their extremely small size, appear to provide reinforcing action within the body of the film. That action is particularly true at the outer film surface, where abrasion of the film tends to be prevented by the presence of metal either directly in, or immediately adjacent, the surface.

An important feature of the invention is the use of a very high proportion of the metal with relation to the resin binding material. Preferably only enough resin is used to insure continuity of the resin film between particles of the metal. The exact amount of resin to accomplish that purpose depends considerably on the exact shape and size of the finely divided metal and upon such factors as the method of application and the thickness of coating. It has been found that a film of outstanding strength and durability may be produced with a weight ratio of aluminum to dry powdered resin between about 4:1 and about 7:1. For normal types of service, and with atomized aluminum of about 30 micron diameter, the preferred aluminum-to-resin ratio lies in the range between 5:1 and 6:1.

The ratios just mentioned, and also all other ratios and percentages described in the present specification and claims refer to weights of the respective components, unless specific statement is made to the contrary.

Calculation indicates that the actual volume of the interstices between closely packed metal particles, assuming spherical particles for definiteness, is only about 35 percent of the volume of the metal. Hence, multiplying by the ratio of densities of resin to aluminum, about 0.41, the weight of resin required to fill such interstices is about 15 percent of the weight of the aluminum. That roughly estimated value corresponds closely to the upper end of the stated range of aluminum to resin, namely 7:1. It could scarcely have been expected that so small a proportion of resin, in combination with solid particles of compact shape, could in actual practice produce a uniform and continuous bond of the remarkably high strength that is provided by the present invention.

It has been found that the effectiveness of a coating of the type described, particularly under severe conditions, depends greatly upon the detailed composition of the solvent by which it is formed. The present invention has provided a solvent composition that leads to superior coatings, capable of withstanding conditions against which no effective protection was previously available.

The new solvent composition comprises a solvent portion and a blending portion. The solvent portion consists primarily of a mixture of intermediate methyl ketones in which methyl ethyl ketone greatly predominates. The relatively high normal volatility of that substance may be reduced to the desired extent by addition of les volatile solvents. However, it has been found that such adjustment of the volatility is particularly effectively accomplished by adding a relatively small proportion of a mixture of methyl isobutyl ketone and methyl amyl ketone in a mutual ratio approximating 2:1. That mixture may be combined with the methyl ethyl ketone in substantially any proportions required to produce the desired degree of overall volatility. In usual practice, one part of that mixture may be added to every 10 to 15 parts of methyl ethyl ketone.

In the preferred overall composition, to be fully described, the combination of ketones that acts as the solvent base includes about 60 parts methyl ethyl ketone, about 3 parts methyl isobutyl ketone and about 2 parts methyl amyl ketone. With such proportions, the volatility of the ketone portion of the composition may be seen to be relatively close to that of methyl ethyl ketone. Such a value is considerably higher than might be expected to prove satisfactory, particularly at the higher temperatures of application already mentioned. It appears, however, that the actual rate of evaporation is effectively reduced by the presence of the relatively large proportion of metal, especially when in extremely finely divided form, and that the exceptional fineness of the described 30 micron aluminum particles therefore plays an important role in permitting use of a more volatile solvent portion than would otherwise be feasible. It is believed that the relatively high volatility of the entire ketone fraction plays an essential part in providing satisfactory results throughout the wide range of temperatures normally encountered.

In addition to the described mixture of ketones, which provides the primary direct solvent action, the composition includes a substantial portion that promotes blending of the other components. Attendant functions of that blending portion appear to be an accelerated penetration of the surface treated, and a lubricating and wetting action that promotes spreading of the coat uniformly over the surface. An especially beneficial blending and lubricating action is found to be provided by a mixture of toluene and ethylene dichloride in a ratio between about 3:1 and about 5:1. When added in mutual proportions within that preferred range, the total amount of the blending mixture may vary between about one fifth and about one third of the described ketone mixture. A particular advantage of the toluene appears to be the prevention of blistering when the coating is applied to a hot surface, for example at temperatures encountered in hot sunshine and at warm air temperatures. Metal surfaces may then reach 150° F., or even higher. At such temperature, the retarding of evaporation by toluene in the concentration range mentioned is ordinarily sufficient to prevent actual blistering, but the heat may still produce pinholes in the coating that prevent the required impermeability. It has been found that the addition of ethylene dichloride in combination with the toluene, and in the proportions described, overcomes that tendency to porosity at high temperatures, and yet does not prevent satisfactory drying and curing of the coating at normal and even at extremely low temperatures. The preferred composition to be described, which appears most fully to provide full effectiveness over the entire temperature range that may be encountered in normal industrial applications, contains approximately 4 parts toluene and 1 part ethylene dichloride to every 14 parts of the ketone solvent portion.

It has been discovered, further that the quality of the coating that is produced by the composition as thus far described may be considerably improved by addition of certain substances that will be referred to for clarity as additives. The invention is concerned with two distinct groups of such additives. Those groups may be effectively employed separately, particularly with relation to certain methods of application, as will be described. However, the most satisfactory form of the invention for spray application employs additives of both groups in combination. In that form, they appear to supplement each other in a particularly effective manner.

A first group includes ammonium thiocyanate, which provides a hardening action on the resin in the finished coating, and is believed also to produce an etching action on metal surfaces, tending to produce a firmer bond with the metal. Action of the same type may well take place with respect to the aluminum particles of the composition itself, binding those particles more firmly into a unitary film. A second element of the first group of additives is acetaldehyde, which similarly promotes hardening of the film. It appears not only to supplement the action of the thiocyanate, but to actually increase that action by stabilizing the thiocyanate in solution. The final element of the first group of additives is furfuryl alcohol, which appears to be particularly effective in stabilizing the ammonium thiocyanate in solution. Moreover, that stabilizing action by the furfuryl alcohol is believed to be more effective in the presence of acetaldehyde. Effective utility of the three additives just mentioned does not depend upon any precise proportions, and does not require that all three be present. However, it is preferred to add them in substantially equal concentrations. When so added, from about one to about 5 percent of each may be used, based on the entire liquid vehicle composition.

The second group of additives referred to above includes a relatively small quantity of perthiocyanic acid, which is preferably added in the form of a rather dilute solution in ethyl alcohol saturated with ammonia. That additive is found to be a particularly effective etching agent, assuring a firm bond between the final coating and a metal surface. Improved stability and action of the etching agent are obtained when propylmercury bromide is provided, as a further additive, in a ratio of from about 2:1 to about 8:1 with respect to the thiocyanic acid. The propylmercury bromide is preferably also added in solution in ethyl alcohol, and may effectively be combined with the thiocyanic acid solution as a sub-formula. The ethyl alcohol provides the dual function of carrying the propylmercury bromide and thiocyanic acid into solution in the main body of the vehicle, and of similarly carrying dissolved ammonia. The latter ingredient supports the ethylene dichloride in performing its described functions. The amount of that sub-formula that is added to the composition may vary rather widely in accordance with the type of application contemplated. It may represent, for example, an amount of perthiocyanic acid from about 0.005 to about 0.1 percent, and of propylmercury bromide from about 0.01 to as much as one percent of the liquid vehicle composition. For general purposes an illustrative preferred concentration of those two ingredients is as given in the following preferred composition.

The following example illustrates a specific composition in accordance with the invention, and represents the preferred form of the composition for spray application, not including the acetone and propylene oxide that may be utilized to form a paste of the solid ingredients, as described below. The specific proportions indicated are not intended to limit the scope of the invention.

| Component: | | Percent |
|---|---|---|
| Aluminum powder, atomized, 30 micron | 42.5 | |
| Polymerized vinyl chloride acetate resin | 7.5 | |
| Total solids | | 50.0 |
| Methyl ethyl ketone | 32.0 | |
| Methyl isobutyl ketone | 1.7 | |
| Methyl amyl ketone | 1.0 | |
| Solvent portion | | 34.7 |
| Toluene | 9.2 | |
| Ethylene dichloride | 2.6 | |
| Blending portion | | 11.8 |
| Ammonium thiocyanate | 1.0 | |
| Acetaldehyde | 1.0 | |
| Furfuryl alcohol | 1.0 | |
| Perthiocyanic acid | 0.008 | |
| Propylmercury bromide | 0.032 | |
| Alcohol | 0.40 | |
| Ammonia | 0.06 | |
| Additives | | 3.5 |

As has already been indicated, one of the advantages of compositions within the specified ranges of component proportions, and an advantage presented in particularly striking form by the preferred formula just set out, is the relatively high volatility of the liquid vehicle that has been attained without the usual disadvantages that result from rapid evaporation, such as blistering or porosity of coatings applied at high temperatures. As a result of that relatively rapid evaporation, coatings of very substantial thickness and corresponding strength can be built up by spraying application in what is effectively a single treatment. Thus, a layer 20 mils or more in thickness may be produced on a horizontal surface, and will dry to a hard and uniform coating. On vertical surfaces the spray gun may be set to produce a layer as thick as 3 mils on each pass. After each pass a skin forms on the surface almost immediately, producing a layer without appreciable tackiness but still soft beneath. Additional passes may be applied at intervals of only 10 to 20 seconds without producing sagging of the combined coat, up to a total thickness as great as 20 mils, for example. Such possibility of producing relatively thick coats in one operation without loss of physical characteristics and quality of the resulting protective cover is a great practical advantage, and provides an important feature of the invention.

Especially satisfactory performance can be obtained with compositions of the type described by the following certain procedures in compounding them. It is preferred, in preparing a composition for spray application, to combine the first described group of additives with the blending portion of the composition and with somewhat less than half of the whole amount of methyl ethyl ketone to form a "Solution A." The second group of additives, in the form of the described sub-formula, is similarly first combined with the remainder of the methyl ethyl ketone and with the other ketones of the described solvent portion of the composition to form a "Solution B." After each of those solutions has aged, preferably for at least a day or two, they may be mixed to form the complete solvent vehicle, and the required amount of finely divided metal and vinyl resin added.

To facilitate dispersion of the latter components in the solvent, it has been found that the metal and the resin in fine powder form should be thoroughly mixed in advance in the presence of just sufficient of a fluid suspending agent to provide mobility of the mixture, resulting in a smooth paste. A small amount of acetone may be used for that purpose, preferably supplemented by a moderate proportion of propylene oxide. Particularly for formulating compositions for spray application, the metal-resin paste may be made up with methyl ethyl ketone rather than acetone.

As a specific example of that described procedure for making the compositions of the invention, a preferred composition having substantially the typical proportions stated above may be made up in the following manner. In such formulation it is preferred that in forming each sub-group of components the ingredients be added in the order enumerated.

Solution A, referred to above, typically comprises:
    60 parts methyl ethyl ketone
    25 parts toluene
    7 parts ethylene dichloride
    8 parts Sub-Formula A, comprising equal parts of:
        Furfuryl alcohol
        Acetaldehyde
        Ammonium thiocyanate The previously described Solution B typically comprises:
    75 parts methyl ethyl ketone
    13 parts methyl isobutyl ketone
    8 parts methyl amyl ketone
    4 parts Sub-Formula B.

Sub-Formula B typically consists of 4 parts propylmercury bromide dissolved in 25 parts ethyl alcohol, to which is added 1 part perthiocyanic acid dissolved in 30 parts ethyl alcohol saturated with ammonia.

The complete solvent vehicle for spraying is then made up in preferred form by adding 1 part Solution B to 3 parts Solution A. It is preferred not to mix Solutions A and B until reasonably close to the time of use. An effective solvent vehicle may alternatively be prepared by combining Solutions A and B in proportions other than that described. For example, satisfactory results for spraying application under normal conditions are obtained with Solution B alone. For extreme conditions, such as the range of temperatures already discussed, compositions of the type of the full formulation are superior.

A corresponding preferred formulation of the solid components typical contains 85 parts 30 micron atomized unpolished aluminum powder and 15 parts finely powdered co-polymerized vinyl chloride and vinyl acetate resin dispersed in acetone, supplemented with propylene oxide, in just sufficient quantity to produce a stiff paste. For typical spray application, 12 lb. of that paste are preferably used per gallon of the complete solvent vehicle. Thorough mixing is important, and agitation during spraying is preferable.

An important feature of the described formulation procedure is the fact that which ever of the described additives may be used are introduced into the solvent prior to its combination with the solid components. The described functions of the several additives, whether these be employed in full combination or otherwise, appear to be most effectively performed under that procedure, leading to superior coatings, particularly with respect to durability, adherence, and absence of porosity.

It has been discovered, further, that when the composition is formulated in the manner indicated, a particularly effective relatively heavy composition may be produced, which is suitable for application by spatula or knife, for example, by adding to the described aluminum and resin paste the liquid described as Solution A in a ratio of approximately 1 part of Solution A to 48 parts of paste. It is preferred to add the liquid to the paste in the original paste container, then cover and invert the container, and permit it to stand undisturbed for a period of no less than 72 hours. The contents are then stirred thoroughly before use. The result is a superior filling material that has exceptional adhesion to many different surfaces, such as metal, wood and concrete, and that dries even in very thick layers to a hard and non-brittle mass.

I claim:

1. A coating composition comprising finely divided metal particles selected from the group consisting of magnesium, aluminum and stainless steel and having an average screen size less than about 325 mesh, and polymerized vinyl resin selected from the group consisting of polymerized vinyl chloride resin and co-polymerized vinyl chloride and vinyl acetate resin in a ratio of metal to resin between about 4:1 and about 7:1 in a solvent vehicle, the said vehicle including a solvent portion comprising predominantly methyl ethyl ketone and including also a blending portion consisting essentially of a mixture of toluene and ethylene dichloride in a ratio between about 3:1 and about 4:1, the ratio of the said solvent portion to the said blending portion being approximately 3:1.

2. A coating composition as defined in claim 1, the said vehicle including also a relatively minor proportion of ammonium thiocyanate.

3. A coating composition as defined in claim 1, the said vehicle including also a relatively minor proportion of acetaldehyde.

4. A coating composition as defined in claim 1, the said vehicle including also ammonium thiocyanate, acetaldehyde and furfuryl alcohol, in relatively minor and substantially equal proportions.

5. A coating composition as defined in claim 1 and including also perthiocyanic acid in a concentration between about 0.005 and about 0.1 percent.

6. A coating composition as defined in claim 1 and including also perthiocyanic acid and propylmercury bromide in a ratio approximating 1:4, the concentration of perthiocyanic acid being between about 0.005 and about 0.1 percent.

7. The method of producing the composition defined by claim 6, said method comprising combining the resin in finely powdered form and the finely divided metal in the presence of a suspending fluid to form a paste, combining the remaining said components of the composition to form the said vehicle, and combining the paste and the vehicle to form the said composition.

8. A coating composition comprising finely divided metal particles selected from the group consisting of magnesium, aluminum and stainless steel and having an average screen size less than about 325 mesh, and polymerized vinyl resin selected from the group consisting of polymerized vinyl chloride resin and co-polymerized vinyl chloride and vinyl acetate resin in a ratio of metal to resin between about 4:1 and about 7:1 in a solvent vehicle, the said vehicle including a solvent portion and a blending portion, the solvent portion consisting essentially of about 60 parts methyl ethyl ketone, about 3 parts methyl isobutyl ketone and about 2 parts methyl amyl ketone, and the said blending portion consisting essentially of about 20 parts toluene and about 5 parts ethylene dichloride.

9. A coating composition as defined in claim 8 and in which the vinyl resin is produced by copolymerization of about 86 percent vinyl chloride, about 13 percent vinyl acetate and about 1 percent maleic acid.

10. A coating composition as defined in claim 8, the said vehicle including also about two parts each of ammonium thiocyanate, acetaldehyde and furfuryl alcohol.

11. A coating composition as defined in claim 10, the said vehicle including also about $\frac{1}{60}$ part perthiocyanic acid and about $\frac{1}{15}$ part propylmercury bromide.

12. The method of producing the composition defined by claim 11, said method comprising combining the ammonium thiocyanate, the acetaldehyde and the furfuryl alcohol to form a first sub-formula, combining the perthiocyanic acid and the propylmercury bromide dissolved in alcohol to form a second sub-formula, combining the toluene, the ethylene dichloride, the first sub-formula and a substantial portion of the methyl ethyl ketone to form a third sub-formula, combining the remainder of the methyl ethyl ketone, the isobutyl ketone, the methyl amyl ketone and the second sub-formula to form a fourth sub-formula, combining the third and fourth subformulas to form the said vehicle, and combining the so-formed vehicle with the polymerized vinyl resin and the metal powder to form the said composition.

13. A coating composition comprising finely divided metal particles selected from the group consisting of magnesium, aluminum and stainless steel and having an average screen size less than about 325 mesh, and polymerized vinyl resin selected from the group consisting of polymerized vinyl chloride resin and co-polymerized vinyl chloride and vinyl acetate resin in a ratio of metal to resin between about 4:1 and about 7:1 in a solvent vehicle, the said vehicle comprising a solvent portion and a blending portion, and the said solvent portion consisting essentially of 10 to 15 parts methyl ethyl ketone and one part mixture of methyl isobutyl ketone and methyl amyl ketone in a mutual ratio approximating 2:1.

14. A coating composition as defined in claim 13, the said vehicle including also a relatively minor proportion of ammonium thiocyanate.

15. A coating composition as defined in claim 14, the said vehicle including also a relatively minor proportion of acetaldehyde.

16. A coating composition as defined in claim 13, the said vehicle including also ammonium thiocyanate, acetaldehyde and furfuryl alcohol, in relatively minor and substantially equal proportions.

17. A coating composition as defined in claim 13 and including also perthiocyanic acid in a concentration between about 0.005 and about 0.1 percent.

18. A coating composition as defined in claim 17 and including also perthiocyanic acid and propylmercury bromide in a ratio approximating 1:4, the concentration of perthiocyanic acid being between about 0.005 and about 0.1 percent.

19. In a coating composition that comprises finely divided metal and polymerized vinyl resin selected from the group consisting of polymerized vinyl chloride resin and co-polymerized vinyl chloride and vinyl acetate resin in a solvent vehicle; the improvement characterized by the fact that the finely divided metal consists essentially of aluminum particles of block-like form and stainless steel particles of flake form in a weight ratio between about 3:1 and about 20:1, the aluminum and stainless steel particles each having an average screen size less than about 325 mesh, and the said vehicle including a solvent portion comprising predominantly methyl ethyl ketone and including also a blending portion consisting essentially of a mixture of toluene and ethylene dichloride in a ratio between about 3:1 and about 4:1, the ratio of the said solvent portion to the said blending portion being approximately 3:1.

20. In a coating composition that comprises finely divided metal and polymerized vinyl resin selected from the group consisting of polymerized vinyl chloride resin and co-polymerized vinyl chloride and vinyl acetate resin in a solvent vehicle; the improvement characterized by the fact that the finely divided metal consists essentially of aluminum particles and stainless steel particles in a weight ratio between about 3:1 and about 20:1, the aluminum and stainless steel particles each having a screen size less than about 325 mesh, and the ratio of metal to resin being between about 4:1 and about 7:1, and the said vehicle including a solvent portion and a blending portion, the solvent portion consisting essentially of about 60 parts methyl ethyl ketone, about 3 parts methyl isobutyl ketone and about 2 parts methyl amyl ketone, and the said blending portion consisting essentially of about 20 parts toluene and about 5 parts ethylene dichloride.

21. A coating composition comprising finely divided metal particles selected from the group consisting of magnesium, aluminum and stainless steel and having an average screen size less than about 325 mesh, and polymerized vinyl resin selected from the group consisting of polymerized vinyl chloride resin and co-polymerized vinyl chloride and vinyl acetate resin in a ratio of metal to resin between about 4:1 and about 7:1 in a solvent vehicle, the said vehicle including a solvent portion and a blending portion, the solvent portion consisting essentially of about 60 parts methyl ethyl ketone, about 3 parts methyl isobutyl ketone and about 2 parts methyl amyl ketone, and the said blending portion consisting essentially of about 20 parts toluene and about 5 parts ethylene dichloride, the said vehicle including also about 1/60 part perthiocyanic acid and about 1/15 part propylmercury bromide.

References Cited in the file of this patent
UNITED STATES PATENTS

| | | |
|---|---|---|
| 2,368,161 | Rubner | Jan. 30, 1945 |
| 2,463,561 | Riley | Mar. 8, 1949 |
| 2,675,363 | Howard et al. | Apr. 13, 1954 |